United States Patent Office 3,108,998
Patented Oct. 29, 1963

3,108,998
2-AMINO-BICYCLO-HEPTANES, OCTANES, NONANES AND DECANES
George Ireland Poos, Ambler, Pa., assignor to McNeil Laboratories, Incorporated, a corporation of Pennsylvania
No Drawing. Filed Dec. 27, 1960, Ser. No. 78,340
20 Claims. (Cl. 260—247.2)

This invention relates to a new series of organic compounds of the general formula:

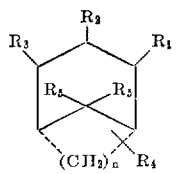

wherein $R_1$ is —N=B, which stands for amino, N-monosubstituted amino and N,N-disubstituted amino, $R_2$ and $R_3$ are hydrogen or aryl, $R_4$ is hydrogen, alkyl or aryl, $R_5$ and $R_6$ are nonidentical members of the group consisting of hydrogen, hydroxyl, aryl, aralkyl, substituted aryl, esterified hydroxyl and etherified hydroxyl, with the proviso that, when $R_5$ and $R_6$ are taken together they form the =NX or =$Cy_2$ group. In the above general formula $n$ is a positive integer from 1 to 4. In =NX, the group X stands for hydroxyl, esterified hydroxyl or etherified hydroxyl and in $Cy_2$, $y$ stands for aryl. It is specifically provided, in the above formula, that when $R_5$ is hydrogen and $R_6$ is hydroxyl, $R_3$ stands for aryl. Also included within the scope of this invention are their nontoxic, pharmaceutically compatible acid addition salts and quaternary ammonium compounds.

In the above general formula aryl stands for a mononuclear aryl, such as phenyl, tolyl and xylyl, including substituted aryl wherein the substituents are halo radicals, for example chloro, fluoro or iodo; alkyl, including lower alkyl, such as methyl, ethyl, propyl, butyl, isopropyl, isobutyl, pentyl, isopentyl; and lower alkoxy wherein the alkyl radical attached to the oxygen is one of those given above. The radical —N=B represents an amino group such as free amino, N-monosubstituted amino or N,N-disubstituted amino. A disubstituted amino group may be an N,N-di-lower hydrocarbonamino group, the hydrocarbon groups of which contain from 1 to 7 carbon atoms, such as N,N-di-lower alkylamino, e.g. dimethylamino, diethylamino, methylethylamino, dipropylamino or dibutylamino; N-lower alkyl-N-lower cycloalkylamino, e.g. N-methyl-N-cyclopentylamino or N-methyl-N-cyclohexylamino; N,N-di-lower alkenylamino, e.g. diallylamino; or N-lower alkyl-N-lower alkenylamino, e.g. N-methyl-N-allylamino. The group —N=B also represents an N,N-lower alkyleneamino group containing in the alkylene chain from 4 to 6 carbon atoms arranged in a carbon chain or interrupted by a hetero atom such as oxygen, sulfur or nitrogen. Radicals representing such amino groups are pyrrolidino, piperidino, hexamethyleneamino, morpholino, thiamorpholino, or piperazino. Monosubstituted amino groups are lower alkyl and lower cycloalkylamino groups containing from 1 to 7 carbon atoms, e.g. methyl-, ethyl-, propyl-, isopropyl, cyclopentyl- or cyclohexylamino groups.

Esterified hydroxyl substituents include lower alkylcarbonyloxy and arylcarbonyloxy, such acyl substituents may thus be radicals of aromatic or aliphatic or araliphatic carboxylic acids, for example acetic, propionic, 3,4,5-trimethoxybenzoic, 3,4 - dimethoxybenzoic, ethylbenzilic, phenylacetic, 4-methoxybenzoic, 3,4-dimethoxybenzoic, syringic, and o-carbalkoxysyringic. Etherified hydroxy substituents include mono- and di-arylalkyleneoxy and mono- and di-arylalkyloxy groups.

Acid addition salts of the compounds of this invention are those obtainable by reaction with organic or inorganic acids and yielding therapeutically active compounds as for example hydrohalic acids such as hydrochloric, hydrobromic or hydriodic acid; sulfuric, nitric, phosphoric, acetic, propionic, glycolic, lactic, pyruvic, oxalic, malonic, succinic, maleic, fumaric, malic, tartaric, citric, benzoic, cinnamic, mandelic, methanesulfonic, ethanesulfonic, salicylic, p-aminosalicylic, 2-phenoxybenzoic and 2-acetoxybenzoic acid.

Also intended to be included within the scope of the present invention are the quaternary ammonium compounds of the above-defined genus. These include the lower alkohalides, such as methiodides, ethobromides or propylchlorides; lower alkenohalides, such as allylbromides; lower alkosulfates, such as dimethosulfates or diethosulfates and the corresponding hydroxides.

Depending upon the conditions employed during the course of the reaction, the novel compounds are obtained either in the form of the free bases or salts thereof. The salts are converted to the free bases in the usual manner, e.g. by reaction with alkali such as sodium or potassium hydroxide. The bases can be converted to their therapeutically useful acid addition salts by reaction with an appropriate organic or inorganic acid.

Quaternary ammonium compounds of this invention having the above general formula are lower alkohalides such as methiodides, ethobromides or propochlorides; lower alkenohalides such as allyl bromides; lower alkosulfates such as dimethosulfates or diethosulfates, and the corresponding hydroxides.

The novel compounds may be converted into the corresponding quaternary ammonium compounds by reaction of the tertiary bases with alkylating agents, i.e. alkyl or aralkyl halides or esters formed by reacting alkanols with an oxygen-containing acid. Examples include: methyl iodide, ethyl bromide, propyl chloride; lower alkenyl halides—(allyl bromide); di-lower alkyl—sulfates—(dimethylsulfate, diethylsulfate); lower alkyl arylsulfonates—(methyl p-toluolsulfonate), or aralkyl halides— (benzyl chloride). The quaternizing reaction may be performed in the presence or absence of a solvent, at room temperature or under cooling, at atmospheric pressure or in a closed vessel under pressure. Suitable solvents for this purpose are ethers, ketones and lower alkanols, of these diethylether, acetone, ethanol, propanol and butanol are preferred, or organic acid amides such as formamide or dimethylformamide.

The resulting quaternary ammonium compounds may be converted into the corresponding quaternary ammonium hydroxides. This may be accomplished by reaction of the quaternary ammonium halides with silver oxide, by reaction of the sulfates with barium hydroxide, by treating the quaternary salts with an anion exchanger or by electrodialysis. Quaternary ammonium salts may be prepared from the resulting base by reaction with acids, such as those mentioned hereinabove for the preparation of the acid addition salts, or, if desired, with a mono-lower alkylsulfate, such as methylsulfate or ethylsulfate. The quaternary ammonium compound may also be converted into another quaternary salt directly without conversion into the quaternary ammonium hydroxide. Thus, a quaternary ammonium iodide may be reacted with freshly prepared silver chloride to yield the quaternary ammonium chloride, or the quaternary ammonium iodide may be converted into the corresponding chloride by treatment with hydrochloric acid in anhydrous methanol.

The compounds of this invention are useful as anti-inflammatory agents and may be used in the form of pharmaceutical preparations which contain the compounds, salts or quaternary ammonium compounds thereof in admixture with a pharmaceutical organic or inorganic solid or liquid carrier suitable for oral or parenteral administration. For formulating the preparations, one may employ substances which do not react with the new compounds, such as water, gelatin, lactose, starches, magnesium stearate, talc, vegetable oils, gums, polyalkylene glycols, etc. The pharmaceutical preparations may be in the form of tablets, pills, capsules or in liquid form such as solutions, suspensions or emulsions. If desired, the novel compounds may be formulated with other therapeutically active substances. The actual dose administered in therapy depends essentially on the condition of the individual patient and the desires of the practicing physician.

The compounds defined in accordance with the above general formula are prepared from appropriate enamine starting materials which are obtained by reacting the desired ketone with a secondary amine in an organic solvent. The anamine is then reacted with an alpha-beta-unsaturated aldehyde to give a cyclic ketone which is then reduced to the corresponding alcohol and subsequently esterified, if desired, or it may be converted to the alcohol by treatment with an aryllithium reagent.

The alpha-beta-unsaturated aldehydes useful in the preparation of the above-mentioned cyclic ketones include unsaturated hydrocarbon aldehydes as for example acrolein or aromatic aldehydes such as cinnamaldehyde.

Conversion of the cyclic ketone to the alcohol by treatment with an aryllithium reagent occurs readily in the presence of inert organic solvents such as tetrahydrofurane, diethylether, dioxane, etc. Included among phenyllithium reagents suitable for this purpose are tolyllithium, phenyllithium, haloaryllithium, such as parachlorophenyllithium, etc.

Reduction of the cyclic ketone to the alcohol may be accomplished with reducing agents, for example catalytically with activated hydrogen, i.e. hydrogen activated by a platinum, palladium or nickel catalyst or by such chemical reducing agents as sodium and absolute alcohol, sodium amalgam and water, lithium aluminum hydride in inert solvents, potassium borohydride, diborane or, preferably, sodium borohydride. As reaction solvents for use in connection with the borohydride method are included alcoholic and hydro-alcoholic mixtures of lower alkanols, such as methanol, ethanol, isopropanol, as well as dioxane and tetrahydrofuran.

Esterification of the hydroxyl group is accomplished by reaction with appropriate acylating agents, that is to say acid anhydrides or acid chlorides of aliphatic or aromatic carboxylic acids. These include acetylchloride, propionylchloride, benzoylchloride, 3,4-dimethoxybenzoylchloride, 3,4,5-trimethoxybenzoylchloride, phenyl acetyl chloride, diphenyl acetyl chloride and their corresponding anhydrides. The reaction is advantageously carried out in the presence of an acid binding agent, such as an alkali carbonate or an alkaline earth carbonate or a strong organic base, for example a tertiary amine, such as pyridine, dimethylamine, quinoline, trimethylamine or triethylamine. The reaction may be conducted in the absence or presence of a solvent, organic or inorganic in nature, polar or nonpolar, such as water, lower alkanols, propyl alcohol, diethyl ether, tetrahydrofurane, dioxane, ethers, halogenated hydrocarbons, ketones, esters, for example, methyl, ethyl, hydracarbons, amides, amines, etc. If desired, one of the above-mentioned acid binding agents may be used in excess as a solvent.

Etherification may be carried out by preliminary conversion of the hydroxyl to alkali metal salt form, followed by reaction with the appropriate alkyl-, arylalkyl- or diarylalkylhalide to give the desired ether.

Conversion of the ketone to the oxime is carried out in accordance with known methods, i.e. by refluxing the ketone with hydroxylamine in the presence of a polar organic solvent such as an alkanol. The oxime so obtained may in turn be esterified in accordance with the second above-mentioned esterification procedure in the presence of an organic or inorganic base.

Alternatively, and preferably, one may esterify the hydroxyl group by preliminary conversion to its alkali metal salt form. This in turn is reacted with an appropriate acylating agent to give the desired ester. Suitable reagents for obtaining the alkali metal salt form include: the alkali metal hydrides, such as sodium hydride and potassium hydride; the alkali metals, per se, and the alkali metal amides. Suitable acylating agents are those mentioned above. Suitable solvents include the nonprotonic organic solvents, such as benzene, toluene, xylene, tetrahydrofuran, ethylene glycol dimethylether, diethylene glycol diethylether and dimethylformamide and dimethylsulfoxide, etc.

Still another method for esterifying the hydroxyl group includes an exchange reaction with a suitable ester. Esters suitable for this purpose include alkyl benzilates, such as methyl benzilate and ethyl benzilate, aryl and diaryl acetates, such as diphenylacetate or phenylacetate. The reaction may be carried out in the presence of catalytic or molar quantities of an alkoxide such as sodium methoxide or sodium ethoxide in an inert solvent with azeotropic removal of the alcohol formed.

The following examples are intended to illustrate, but not limit, the scope of the present invention.

*Example I*

A solution of 98 parts by weight of cyclohexanone and 94.5 parts by weight of pyrrolidine in 100 parts by volume of benzene is heated under reflux for four hours, removing the water formed in a moisture trap. The benzene is removed by distillation and the residue is distilled under reduced pressure. The fraction, boiling at 126 to 130° C./25 to 30 mm., weighing 120.5 parts by weight, is collected, giving 1-(1-pyrrolidinyl)cyclohexene.

*Example II*

A solution of 84.1 parts by weight of cyclopentanone and 94.5 parts by weight of pyrrolidine in 80 parts by volume of benzene is heated under reflux for five hours, removing the water formed in a moisture trap. The benzene is removed by distillation and the residue is distilled under reduced pressure. The fraction, boiling at 53 to 65° C./0.6 mm., weighing 118.5 parts by weight, is collected, giving 1-(1-pyrrolidinyl)cyclopentene.

*Example III*

A solution of 65 parts by weight of cyclohexanone and 70.5 parts by weight of morpholine in 400 parts by volume of toluene is heated under reflux for fourteen hours, removing the water formed in a moisture trap. The toluene is removed by distillation and the residue is distilled under reduced pressure. The fraction, boiling at 95 to 96° C./4 mm., weighing 92.1 parts by weight, is collected giving 1-morpholinocyclohexene.

*Example IV*

A solution of 59 parts by weight of cyclohexanone and 80 parts by weight of N-methylpiperazine in 100 parts by volume of benzene is heated under reflux for eight hours, collecting the water formed in a moisture trap. The benzene is removed by distillation and the residue is distilled under reduced pressure. The fraction, boiling at 147 to 171° C./30 to 45 mm., weighing 69.5 parts by weight, is collected, giving 1-(4-methylpiperazino)cyclohexene.

*Example V*

A solution of 174 parts by weight of 4-phenylcyclohexanone and 94.5 parts by weight of pyrrolidine in 200 parts by volume of benzene is heated under reflux for fifteen hours, removing the water formed in a moisture trap. The benzene is removed by distillation and the residue is distilled under reduced pressure, giving 1-(1-pyrrolidinyl)-4-phenylcyclohexene.

Example VI 60.4 parts by weight of 1-(1-pyrrolidinyl)cyclohexene is dissolved in 120 parts by volume of absolute ethanol and the solution is cooled in an ice-bath. Freshly distilled acrolein (22.4 parts by weight) is dissolved in 80 parts by volume of absolute ethanol and added over a period of thirty minutes to the enamine solution. The reaction mixture is kept at room temperature for twenty hours and then heated under reflux for one hour. The alcohol is removed by distillation and the residue distilled under reduced pressure. The fraction, boiling at 104 to 110° C./0.4 mm., weighing 60 parts by weight, is collected, giving 2-(1-pyrrolidinyl)bicyclo[3,3,1]nonan-9-one.

Example VII 89.5 parts by weight of 1-(1-pyrrolidinyl)cyclopentene is dissolved in 200 parts by volume of dry benzene and the solution cooled in an ice-bath. Freshly distilled acrolein (36.4 parts by weight) is dissolved in 40 parts by volume of dry benzene and added over a period of twenty minutes to the enamine solution. The reaction mixture is heated under reflux for two hours and then left for twenty hours at room temperature.

The benzene solution is extracted with dilute hydrochloric acid, the water layer is made basic with sodium carbonate and the free base extracted with ether. The ether layer is washed with water and dried over anhydrous magnesium sulfate. The ether is evaporated and the dark residue is distilled under reduced pressure. The fraction, boiling at 85 to 95° C./0.1 to 0.5 mm., weighing 41.2 parts by weight, is collected, giving 2-(1-pyrrolidinyl)bicyclo[3,2,1]octan-8-one.

Example VIII 54 parts by weight of 1-(1-pyrrolidinyl)cyclohexene is dissolved in 150 parts by volume of dry benzene. Cinnamaldehyde (47 parts by weight) dissolved in 50 parts by volume of benzene is added to the stirred, cooled solution over a period of fifteen minutes. The reaction mixture is kept for four days at room temperature.

The reaction mixture is heated to its boiling point, cooled to room temperature, and extracted with dilute hydrochloric acid solution. The aqueous solution is washed with ether and made basic with sodium carbonate. The free base is taken up in ether and dried over anhydrous potassium carbonate. Evaporation of the ether yielded 86 parts by weight of a dark residue. This residue is dissolved in isopropyl alcohol and reacted with 35 parts by weight of fumaric acid. A brown fumarate is deposited. Two recrystallizations from methanolether yields 55 parts by weight of slightly yellowish fumarate.

The fumarate is hydrolyzed with a 10% sodium hydroxide solution and the free base is taken up in ether. The solution is dried over anhydrous potassium carbonate and the solvent is removed. The residue is crystallized from petroleum ether, yielding 36 parts by weight of white crystals of 2-phenyl-4-(1-pyrrolidinyl)bicyclo[3,3,1]nonan-9-one, melting point 80 to 84° C.

Example IX

A benzene solution (200 parts by volume) of 75 parts by weight of 1-(1-pyrrolidinyl)cyclopentene and 72 parts by weight of cinnamaldehyde is kept for twenty hours at room temperature. The reaction mixture is then heated to its boiling point and cooled to room temperature. The benzene solution is extracted with dilute hydrochloric acid and the aqueous layer is washed with ether. The free base is regenerated with sodium carbonate and taken up in ether. Removal of the solvent leaves 101 parts by weight of a dark residue. The residue is reacted with fumaric acid, the fumarate purified and converted to the free base, 2-phenyl-4-(1-pyrrolidinyl)bicyclo[3,2,1]octan-8-one, melting point 68 to 73° C.

Example X

A benzene solution (500 parts by volume) of 92.1 parts by weight of 1-morpholinocyclohexene and 70 parts by weight of cinnamaldehyde is kept at room temperature for four days. The solution is heated under reflux for thirty minutes. After cooling to room temperature, the benzene solution is extracted with dilute hydrochloric acid. The aqueous solution is washed with ether and made basic with sodium carbonate. The free base is extracted with ether and dried over anhydrous potassium carbonate. The solvent is removed and the resulting solid, 2-morpholino-4-phenylbicyclo[3,3,1]nonan-9-one, is recrystallized from n-hexane. Yield, 70 parts by weight, melting point 112.5 to 116.5° C. Two recrystallizations from methanol raises the melting point to 117 to 119° C.

Example XI 69.5 parts by weight of 1-(4-methylpiperazino)cyclohexene is dissolved in 500 parts by volume of dry benzene and the solution cooled in an ice-bath. Cinnamaldehyde (48.5 parts by weight) is added over a period of thirty minutes. The solution is kept at room temperature for three days and then heated under reflux for thirty minutes.

The benzene solution is extracted with dilute hydrochloric acid, the water layer is made basic with sodium carbonate. The free base is extracted repeatedly with methylene chloride. The methylene chloride solution is dried over anhydrous potassium carbonate and the solvent removed at the water pump. The residue, 2-phenyl-4-(4-methylpiperazino)bicyclo[3,3,1]nonan-9-one, is recrystallized twice from methanol, melting point 134 to 137° C.

Example XII 50 parts by weight of 1-(1-pyrrolidinyl)-4-phenylcyclohexene is dissolved in 400 parts by volume of dry benzene and the solution is cooled in an ice-bath. Freshly distilled acrolein (12 parts by weight) is dissolved in 50 parts by volume of dry benzene and added over a period of thirty minutes to the enamine solution. The reaction mixture is stirred for two hours at room temperature and then heated under reflux for one hour.

The benzene solution is extracted with dilute hydrochloric acid, the aqueous layer made basic with sodium carbonate and the free base extracted with ether. The ether layer is washed with water and dried over anhydrous potassium carbonate. The solvent is removed at the water pump, and the oil is reacted with fumaric acid in methanol. The fumarate is purified by recrystallization from methanol and converted to the free base, 3-phenyl-6-(1-pyrrolidinyl)bicyclo[3,3,1]nonan-9-one.

Example XIII

Phenyllithium reagent is prepared from 15.1 parts by weight of bromobenzene and 1.34 parts by weight of lithium metal in 100 parts by volume of dry ether.

10 parts by weight of 2-(1-pyrrolidinyl)bicyclo[3,3,1]nonan-9-one dissolved in 70 parts by volume of ether is added to the phenyllithium solution over a period of thirty minutes.

The excess phenyllithium reagent is decomposed with water and the reaction mixture extracted with dilute hydrochloric acid. The free base is regenerated with sodium carbonate and extracted with ether. The ether solution is dried over anhydrous potassium carbonate and saturated with hydrogen chloride. The hydrochloride is recrystallized from ethanol, melting point 228 to 229° C., giving 9-phenyl-2-(1-pyrrolidinyl)bicyclo[3,3,1]nonan-9-ol.

Example XIV

Phenyllithium reagent is prepared from 33.0 parts by weight of bromobenzene and 2.9 parts by weight of lithium metal in 100 parts by volume of dry ether.

21.6 parts by weight of 2-(1-pyrrolidinyl)bicyclo[3,2,1]-octan-8-one is dissolved in 50 parts by volume of ether and added to the phenyllithium solution over a period of thirty minutes. The reaction mixture is stirred at room temperature for three hours.

The ether solution is washed with water and dried over anhydrous potassium carbonate. The dried solution is saturated with hydrogen chloride and the resulting suspension filtered.

The hydrochloride is hydrolyzed with dilute potassium hydroxide solution and the free base extracted with ether. The ether solution is dried over anhydrous potassium carbonate and the solvent removed at the water pump. Yield, 9.5 parts by weight (32%). The product, 8-phenyl-2-(1-pyrrolidinyl)bicyclo[3,2,1]octan-8-ol, is recrystallized from ethyl acetate, melting point 114 to 116.5° C.

*Example XV*

Phenyllithium reagent is prepared from 39 parts by weight of bromobenzene and 3.5 parts by weight of lithium metal in 300 parts by volume of dry ether.

35.5 parts by weight of 2-phenyl-4-(1-pyrrolidinyl)-bicyclo[3.3.1]nonan-9-one is dissolved in 300 parts by volume of ether and added to the stirred phenyllithium solution over a period of one hour. The reaction mixture is stirred at room temperature for two hours and then heated under reflux for thirty minutes.

The excess phenyllithium is decomposed with water. Dilute hydrochloric acid is added and the suspension is filtered. The ether layer is discarded. The solid is dissolved in dilute hydrochloric acid and methylene chloride. The aqueous solutions are combined and extracted twice with methylene chloride. The combined methylene chloride solutions are shaken thoroughly with dilute sodium hydroxide solution and dried over anhydrous potassium carbonate. The solvent is removed at the water pump and the crystalline residue, 2,9-diphenyl-4-(1-pyrrolidinyl)bicyclo[3,3,1]nonan-9-ol, is recrystallized from ethyl acetate. Yield, 32.8 parts by weight, melting point 189 to 192° C.

*Example XVI* o-Tolyllithium reagent is prepared from 12 parts by weight of o-bromotoluene and 1.0 part by weight of lithium metal in 100 parts by volume of dry ether.

10 parts by weight of 2-phenyl-4-(1-pyrrolidinyl)bicyclo[3,3,1]nonan-9-one is dissolved in 70 parts by volume of ether and added to the o-tolyllithium solution. The reaction mixture is stirred for four hours at room temperature.

The product, 2-phenyl-4-(1-pyrrolidinyl)-9-o-tolyl-bicyclo[3,3,1]nonan-9-ol, is isolated as described in Example XV.

Yield, 12 parts by weight, melting point 185 to 189° C.

*Example XVII* p-Chlorophenyllithium reagent is prepared from 20.5 parts by weight of p-chlorobromobenzene by an exchange reaction with ethyllithium, prepared from 11.5 parts by weight of ethyl bromide and 1.5 parts by weight of lithium metal in 100 parts by volume of ether.

10 parts by weight of 2-phenyl-4-(1-pyrrolidinyl)bicyclo[3,3,1]nonan-9-one is dissolved in 70 parts by volume of ether and added to the p-chlorophenyllithium solution over a period of thirty minutes. The reaction mixture is stirred at room temperature for two hours and heated under reflux for one hour.

The product, 9-p-chlorophenyl-2-phenyl-4-(1-pyrrolidinyl)bicyclo[3,3,1]nonan-9-ol, is isolated as described in Example XV.

*Example XVIII*

Phenyllithium reagent is prepared from 10 parts by weight of bromobenzene and 1.0 part by weight of lithium metal in 100 parts by volume of dry ether.

7 parts by weight of 2-phenyl-4-(1-pyrrolidinyl)bicyclo[3,2,1]octan-8-one is dissolved in 50 parts by volume of ether and added to the phenyllithium solution over a period of fifteen minutes. The reaction mixture is left for three days at room temperature.

The product, 2,8-diphenyl-4-(1-pyrrolidinyl)bicyclo[3,2,1]octan-8-ol is isolated as described in Example XV.

Yield, 7.5 parts by weight, melting point 154.5 to 158° C.

*Example XIX*

Phenyllithium reagent is prepared from 10.5 parts by weight of bromobenzene and 0.94 part by weight of lithium metal in 100 parts by volume of dry ether.

10 parts by weight of 2-morpholino-4-phenylbicyclo[3,3,1]nonan-9-one is dissolved in 200 parts by volume of ether and the solution added to the phenyllithium reagent. The reaction mixture is stirred for three hours at room temperature.

The product, 4-morpholino-2,9-diphenylbicyclo[3,3,1]nonan-9-ol, is isolated as described in Example XV.

Yield, 10.3 parts by weight, melting point 187 to 190° C.

*Example XX*

Phenyllithium reagent is prepared from 10.0 parts by weight of bromobenzene and 0.9 part by weight of lithium in 100 parts by volume of ether.

10.0 parts by weight of 2-phenyl-4-(4-methylpiperazino)bicyclo[3,3,1]nonan-9-one is dissolved in 100 parts by volume of ether and added to the phenyllithium solution over a period of thirty minutes. The reaction mixture is stirred at room temperature for two hours and heated under reflux for one hour.

The product, 2,9-diphenyl-4-(4-methylpiperazino)bicyclo[3,3,1]nonan-9-ol, is isolated as described in Example XV.

Yield, 6.4 parts by weight, melting point 163 to 166° C.

*Example XXI*

40 parts by weight of 2-(1-pyrrolidinyl)bicyclo[3,2,1]octan-8-one is dissolved in 250 parts by volume of methanol containing ten drops of water. The solution is cooled in an ice-bath and 7 parts by weight of sodium borohydride is added over a period of fifteen minutes while stirring. The reaction mixture is stirred at room temperature for eighteen hours.

The reaction mixture is diluted with 300 parts by volume of water and extracted four times with 100 parts by volume portions of ether. The ether extracts are washed with saturated sodium chloride solution and dried. Removal of solvent yielded 40.5 parts by weight of a white semi-solid. The two stereoisomeric alcohols are separated by distillation. The first fraction (19 parts by weight, boiling point 110 to 120° C./1 mm.) contains mostly a liquid isomer. The second fraction (19 parts by weight, boiling point 120 to 130° C./1 mm.) is a solid, 2-(1-pyrrolidinyl)bicyclo[3,2,1]octan-8-ol, which upon recrystallization from ethyl acetate melted at 117.5 to 119.5° C.

*Example XXII*

10.8 parts by weight of 2-phenyl-4-(1-pyrrolidinyl)-bicyclo[3,3,1]nonan-9-one is dissolved in 100 parts by volume of methanol containing four drops of water. Sodium borohydride (2 parts by weight) is added in small portions over a period of five minutes, while stirring and cooling the reaction mixture in an ice-bath. The resulting solution is stirred for eighteen hours at room temperature.

The reaction mixture is diluted with 100 parts by volume of water and extracted with two 100 parts by volume portions of ether. The ether extracts are washed with saturated sodium chloride solution and dried. The solvent is removed at the water pump and the resulting oil triturated with petroleum ether. The suspension, 2- phenyl-4-(1 - pyrrolidinyl)bicyclo[3,3,1]nonan-9-ol, is filtered. Yield, 7.25 parts by weight. Recrystallized from ethyl acetate, melting point 103.5 to 105° C.

*Example XXIII*

25.0 parts by weight of 2-morpholino-4-phenylbicyclo-[3,3,1]nonan-9-one is dissolved in 250 parts by volume of methanol containing ten drops of water. Sodium borohydride (5 parts by weight) is added in small portions over a period of five minutes, while stirring and cooling the reaction mixture in an ice-bath. The resulting solution is stirred at room temperature for five hours.

The reaction mixture is diluted with 300 parts by volume of water and extracted with three portions of ether. The ether extracts are washed with saturated sodium chloride solution and dried. The solvent is removed at the water pump and the resulting oil triturated with petroleum ether. The suspension is filtered and the product, 2-morpholino-4-phenylbicyclo[3,3,1]nonan-9-ol, recrystallized from ethyl acetate.

Yield, 24 parts by weight, melting point 160 to 165° C.

*Example XXIV*

10 parts by weight of 2-phenyl-4-(4-piperazino)bicyclo-[3,3,1]nonan-9-one is dissolved in 100 parts by volume of methanol containing four drops of water. Sodium borohydride (2 parts by weight) is added in small portions over a period of five minutes, while stirring and cooling the reaction mixture in an ice-bath. The resulting solution is stirred at room temperature for five hours.

The reaction mixture is diluted with 150 parts by volume of water and extracted with three portions of ether. The ether extracts are washed with saturated sodium chloride solution and dried. The solvent is removed at the water pump and the resulting oil triturated with petroleum ether. The suspension is filtered and the product, 2-phenyl-4-(4-piperazino)bicyclo[3,3,1]nonan-9-ol, recrystallized from ethyl acetate.

*Example XXV*

10 parts by weight of 3-phenyl-6-(1-pyrrolidinyl)-bicyclo[3,3,1]nonan-9-one is dissolved in 100 parts by volume of methanol containing four drops of water. Sodium borohydride (2 parts by weight) is added in small portions over a period of five minutes, while stirring and cooling the reaction mixture in an ice-bath. The resulting solution is stirred at room temperature for five hours.

The reaction mixture is diluted with 150 parts by volume of water and extracted with three portions of ether. The ether extracts are washed with saturated sodium chloride solution and dried. The resulting oil is triturated with petroleum ether. The suspension is filtered and the product, 3-phenyl-6-(1-pyrrolidinyl)bicyclo[3,3,1]nonan-9-ol, crystallized from ethyl acetate.

*Example XXVI*

10 parts by weight of the liquid isomer of 2-(1-pyrrolidinyl)bicyclo[3,2,1]octan-8-ol is dissolved in 200 parts by volume of dry benzene. Sodium hydride (2.5 parts by weight of 53% suspension in mineral oil) is added and the mixture is stirred at room temperature for one hour and under reflux for ten minutes. The reaction mixture is cooled to ca. 60° C. Diphenylacetyl chloride—prepared from 11.7 parts by weight of diphenylacetic acid and 8.5 parts by weight thionyl chloride—is dissolved in 50 parts by volume of benzene and added to the reaction mixture. After heating under reflux for one hour, the reaction mixture is cooled to room temperature and the unreacted sodium hydride decomposed with methanol. The resulting solution is extracted with dilute hydrochloric acid; the free base is regenerated with sodium carbonate and extracted with ether. The ether solution is dried over anhydrous potassium carbonate. Yield, 14 parts by weight. The product, 2-(1-pyrrolidinyl)bicyclo[3,2,1]-octan-8-yl diphenylacetate, is characterized as its fumarate, melting point 183 to 185° C.

*Example XXVII*

8.4 parts by weight of the solid isomer of 2-(1-pyrrolidinyl)bicyclo[3,2,1]octan-8-ol is dissolved in 200 parts by volume of dry benzene. Sodium hydride (2.04 parts by weight of 53% suspension in mineral oil) is added; the suspension is heated for three hours under reflux and then cooled to room temperature. 3,4,5-trimethoxybenzoyl chloride—prepared from 9.55 parts by weight of 3,4,5-trimethoxybenzoic acid and 10 parts by weight of thionyl chloride—is dissolved in 50 parts by volume of dry benzene and added to the reaction mixture. The suspension is heated under reflux for thirty minutes. The unreacted sodium hydride is decomposed with ethanol and the resulting brown solution extracted with dilute hydrochloric acid. The free base is regenerated with sodium carbonate and extracted with ether. The ether solution is dried over anhydrous potassium carbonate. The removal of solvent yielded 9.3 parts by weight (56%) of a brown oil. The product, 2-(1-pyrrolidinyl)bicyclo-[3,2,1]octan-8-yl-3,4,5-trimethoxybenzoate, is characterized as its hydrochloride, melting point 229.5 to 230° C.

*Example XXVIII*

A mixture of 10 parts by weight of 2-morpholino-4-phenylbicyclo[3,3,1]nonan-9-ol, 8.5 parts by weight of ethyl benzilate and 2.5 parts by weight of sodium methoxide in 500 parts by volume of dry heptane is heated under reflux for twenty hours, removing ca. 300 parts by volume of the heptane-alcohol azeotrope in a Dean-Stark trap. The mixture is cooled to room temperature, diluted with ether and washed with water. The product is extracted with dilute hydrochloric acid, made basic, and taken up in methylene chloride. The methylene chloride solution is dried and the solvent removed. The product, 2 - morpholino-4-phenylbicyclo[3,3,1]nonan-9-yl benzilate, is crystallized from ethyl acetate. Yield, 8.7 parts by weight, melting point 177 to 179° C.

*Example XXIX*

12 parts by weight of 4-phenyl-2-(1-pyrrolidinyl)bi-cyclo[3,3,1]nonan-9-ol is dissolved in 250 parts by volume of dry benzene. Sodium hydride (2 parts by weight of 53% suspension in mineral oil) is added and the suspension heated under reflux for two hours. The reaction mixture is cooled to room temperature and 3.9 parts by weight of acetyl chloride is added. After heating under reflux for one hour, the excess sodium hydride is decomposed with ethanol and the brown solution is extracted with dilute hydrochloric acid. The acid solution is made basic with sodium carbonate and the free base extracted with ether. Evaporation of the solvent yielded 7 parts by weight (50%) of an oil. The product, 4-phenyl-2-(1-pyrrolidinyl)bicyclo[3,3,1]nonan-9-yl acetate, is characterized as its fumarate, melting point 171 to 176° C.

*Example XXX*

12 parts by weight of 3-phenyl-6-(1-pyrrolidinyl)bi-cyclo[3,3,1]nonan-9-ol is dissolved in 250 parts by volume of dry benzene. Sodium hydride (2.0 parts by weight of 53% suspension in mineral oil) is added and the suspension is heated under reflux for two hours. The reaction mixture is cooled to room temperature and 7.7 parts by weight of phenylacetyl chloride is added. The mixture is heated under reflux for one hour, the excess sodium hydride decomposed with ethanol and the brown solution extracted with dilute hydrochloric acid. The acidic solution is made basic with sodium carbonate, extracted with ether and dried. The solvent is removed at the water pump and the product, 3-phenyl-6-(1-pyrrolidinyl)bicyclo[3,3,1]nonan-9-yl phenylacetate, characterized as its hydrochloride.

Example XXXI 10 parts by weight of 2-phenyl-4-(4-piperazino)bicyclo[3,3,1]nonan-9-ol is dissolved in 200 parts by volume of diethyleneglycol diethylether. Sodium hydride (1.6 parts by weight of 53% suspension in mineral oil) is added. The reaction mixture is heated at 80° C. for two hours. Diphenylmethyl chloride (6.5 parts by weight) is added to the cooled solution and the reaction mixture stirred at room temperature for fifteen hours. The solvent is removed under pressure, and the residue is extracted with dilute hydrochloric acid. The free base is regenerated with sodium carbonate and taken up in ether. The ether solution is dried and the solvent removed. The product, 2-phenyl-4-(4-piperazino)bicyclo-[3,3,1]nonan-9-yl diphenylmethyl ether, is isolated and characterized as the hydrochloride.

Example XXXII 10 parts by weight of 2-phenyl-4-(1-pyrrolidinyl)-bicyclo[3,3,1]nonan-9-one is dissolved in 200 parts by volume of dry tetrahydrofurane. Diphenylmethyllithium—prepared by reacting 6.7 parts by weight of butyllithium with 17.6 parts by weight of diphenylmethane in tetrahydrofurane—is added and the reaction mixture is heated under reflux for three hours. The solvent is removed at the water pump and the product, 2-phenyl-9-diphenylmethyl-4-(1-pyrrolidinyl)bicyclo[3,3,1]nonan-9-ol, isolated and characterized as the hydrochloride.

Example XXXIII 15 parts by weight of 2-phenyl-9-diphenylmethyl-4-(1-pyrrolidinyl)bicyclo[3,3,1]nonan-9-ol is dissolved in 100 parts by volume of pyridine. Thionyl chloride (6.0 parts by weight) is added to the solution. The reaction mixture is stirred at room temperature for twenty-four hours and solvent is distilled under reduced pressure. The residue is made basic with sodium hydroxide solution and extracted with methylene chloride. The solution is dried and the solvent removed. The last traces of pyridine are removed under vacuum. The product, 2-phenyl-9-diphenylmethylene-4-(1-pyrrolidinyl)bicyclo-[3,3,1]nonan, is isolated and characterized as the fumarate, melting point 229 to 232° C.

Example XXXIV 17.6 parts by weight of hydroxylamine hydrochloride of 95% purity is suspended in 100 parts by volume of ethanol. 2-(1-pyrrolidinyl)bicyclo[3,3,1]nonan-9-one (50 parts by weight) is added and the reaction mixture is heated under reflux until all solid dissolves. Upon cooling 50 parts by weight (79%) of 2-(1-pyrrolidinyl)-bicyclo[3,3,1]nonan-9-one oxime hydrochloride is deposited, recrystallized from ethanol, melting point 166 to 168° C.

Example XXXV 2.5 parts by weight of hydroxylamine hyrochloride of 95% purity is suspended in 20 parts by volume of ethanol. 2-phenyl-4-(1-pyrrolidinyl)bicyclo[3,3,1]nonan-9-one (10 parts by weight) is added and the reaction mixture is heated under reflux until everything dissolves. Upon cooling, the oxime hydrochloride is deposited. The solid, 2-phenyl-4-(1-pyrrolidinyl)bicyclo[3,3,1]nonan-9-one oxime, is recrystallized from ethanol.

Example XXXVI 10 parts by weight of 2-(1-pyrrolidinyl)bicyclo[3,3,1]-nonan-9-one oxime is dissolved in 50 parts by volume of pyridine. Diphenylacetyl chloride (16.5 parts by weight) is added and the reaction mixture is heated at 60° C. for one hour. The solvent is removed under pressure. The residue is made basic with dilute sodium hydroxide solution and extracted with methylene chloride. The solution is dried and the solvent removed at the water pump. Last traces of pyridine are removed under pressure. The product, 2-(1-pyrrolidinyl)bicyclo[3,3,1]nonan-9-one oxime diphenylacetate, is isolated and characterized as its hydrochloride.

What is claimed is:

1. 9-phenyl-2-(1-pyrrolidinyl)bicyclo[3,3,1,]nonan-9-ol.
2. 8-phenyl-2-(1-pyrrolidinyl)bicyclo[3,2,1]octan-8-ol.
3. 2,9-diphenyl-4-(1-pyrrolidinyl)bicyclo[3,3,1]nonan-9-ol.
4. 2-phenyl-4-(1-pyrrolidinyl)-9-o-tolylbicyclo[3,3,1]nonan-9-ol.
5. 9-p-chlorophenyl-2-phenyl-4-(1-pyrrolidinyl)bicyclo[3,3,1]nonan-9-ol.
6. 2,8-diphenyl-4-(1-pyrrolidinyl)bicyclo[3,2,1]octan-8-ol.
7. 4-morpholino-2,9-diphenylbicyclo[3,3,1]nonan-9-ol.
8. 2,9-diphenyl-4-(4-methylpiperazino)bicyclo-[3,3,1]-9-ol.
9. 3,9-diphenyl-6-(1-pyrrolidinyl)bicyclo[3,3,1]nonan-9-ol.
10. 2-phenyl-4-(1-pyrrolidinyl)bicyclo[3,3,1]nonan-9-ol.
11. 2-morpholino-4-phenylbicyclo[3,3,1]nonan-9-ol.
12. 2-phenyl-4-(4-piperazino)bicyclo[3,3,1]nonan-9-ol.
13. 3-phenyl-6-(1-pyrrolidinyl)bicyclo[3,3,1]nonan-9-ol.
14. 2-(1-pyrrolidinyl)bicyclo[3,2,1]octan-8-yl diphenylacetate.
15. 2-(1-pyrrolidinyl)bicyclo[3,2,1]octan-8-yl-3,4,5-trimethoxybenzoate.
16. 2-morpholino-4-phenylbicyclo[3,3,1]nonan-9-yl benzilate.
17. 4-phenyl-2-(1-pyrrolidinyl)bicyclo[3,3,1]nonan-9-yl acetate.
18. 3-phenyl-6-(1-pyrrolidinyl)bicyclo[3,3,1]nonan-9-yl phenylacetate.
19. 2-phenyl-4-(4-piperazino)bicyclo[3,3,1]nonan-9-yl diphenylmethyl ether.
20. A compound of the formula:

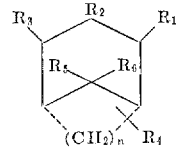

wherein $R_1$ is a member of the group consisting of 1-pyrrolidinyl, morpholino, piperazino and lower alkyl-piperazino, $R_2$ and $R_3$ are members of the group consisting of hydrogen, phenyl, tolyl and halophenyl, $R_4$ is a member of the group consisting of hydrogen, lower alkyl, phenyl, tolyl, halophenyl, $R_5$ and $R_6$ are nonidentical members of the group consisting of hydrogen, hydroxyl, phenyl, tolyl, halophenyl, diphenylmethyl, diphenylmethylene, dimethoxybenzoxy, trimethoxybenzoxy, diphenylacetoxy, benziloxy, acetoxy, phenylacetoxy, diphenylmethoxy, with the proviso that when $R_5$ and $R_6$ are taken together they form a member of the group consisting of =NOH, =NOCOCH(Ph)$_2$ and =C(Ph)$_2$ wherein Ph stands for phenyl, $n$ being a positive integer from 1 to 4, with the additional proviso that when $R_5$ is hydrogen and $R_6$ is hydroxyl, $R_3$ is a member of the group consisting of phenyl and tolyl.

References Cited in the file of this patent

UNITED STATES PATENTS 2,880,211    Elpern    Mar. 31, 1959

OTHER REFERENCES

Gaylord: "Reduction With Complex Metal Hydrides," Interscience Publishers, Inc., New York, pages 124, 283, 305 (1956).

Stork et al.: "J. Am. Chem. Soc.," volume 78, pages 5129–30 (1956).

UNITED STATES PATENT OFFICE
CERTIFICATE OF CORRECTION

Patent No. 3,108,998

October 29, 1963

George Ireland Poos

It is hereby certified that error appears in the above numbered patent requiring correction and that the said Letters Patent should read as corrected below.

Column 1, lines 12 to 19, the formula should appear as shown below instead of as in the patent:

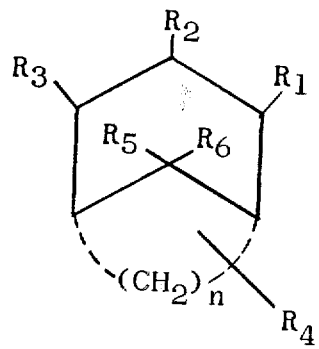

Signed and sealed this 19th day of May 1964.

(SEAL)
Attest:

ERNEST W. SWIDER
Attesting Officer

EDWARD J. BRENNER
Commissioner of Patents